(12) United States Patent
Sahlin et al.

(10) Patent No.: US 6,847,690 B1
(45) Date of Patent: Jan. 25, 2005

(54) DETERMINANT-BASED SYNCHRONIZATION TECHNIQUES AND SYSTEMS

(75) Inventors: Henrik Sahlin, Karlstad (SE); Lars Lindbom, Karlstad (SE); Ingemar Johansson, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 835 days.

(21) Appl. No.: 09/717,007

(22) Filed: Nov. 22, 2000

(51) Int. Cl.[7] .............................. H04B 1/10; H04B 14/04
(52) U.S. Cl. ...................... 375/354; 375/350; 375/340; 375/343; 455/67.11
(58) Field of Search ................................. 375/316, 340, 375/343, 350, 354; 455/67.11, 63.1

(56) References Cited

U.S. PATENT DOCUMENTS

| | | | |
|---|---|---|---|
| 5,191,598 A | 3/1993 | Bäckström et al. | |
| 5,373,507 A | 12/1994 | Sköld | |
| 5,581,580 A | 12/1996 | Lindbom et al. | |
| 5,680,419 A | 10/1997 | Bottomley | |
| 5,706,314 A | 1/1998 | Davis et al. | |
| 5,875,215 A | 2/1999 | Dobrica | |
| 6,084,862 A | * 7/2000 | Bjork et al. | 370/292 |
| 6,449,320 B1 | * 9/2002 | Lindoff | 375/319 |
| 6,603,823 B1 | * 8/2003 | Yellin et al. | 375/340 |

FOREIGN PATENT DOCUMENTS

| | | |
|---|---|---|
| WO | WO01/22571 | 3/2001 |

OTHER PUBLICATIONS

Astely, D. et al.: "Burst Synchronization on Unknown Frequency Selective Channels with Co–Channel Interference Using an Antenna Array", 49th Vehicular Technology Conference, 1999, vol. 3, May 16, 1999, pp. 2363–2367, XP000936234, ISBN: 0–7803–5566–0.

Lee, William C.Y.: "Mobile Communications Design Fundamentals", Howard W. Sams & Co., Indiana, USA, Section 3.5.1.

Proakis, John G.: "Digital Communications, 2nd Edition", McGraw–Hill Book Company, New York, NY, USA, 1989, Section 6.7.

Winters, J.H.: "Signal Acquisition and Tracking with Adaptive Arrays in the Digital Mobile Radio System IS–54 with Flat Fading", IEEE Transactions on Vehicular Technology, vol. 42, No. 4, Nov. 1993.

* cited by examiner

*Primary Examiner*—Temesghen Ghebretinsae
*Assistant Examiner*—Qutub Ghulamali

(57) ABSTRACT

Systems and methods for processing a received radio signal in a communication system are described. Initial time synchronization is acquired using a trace operator. Then, a number of channel taps for use in further processing is determined based on the initial time sync, also using a trace operator. A final synchronization position is then selected using the number of channel taps and, if multiple branches are employed to receive the signal, using a determinant-based technique. Finally, a channel estimate is determined using the final synchronization position.

23 Claims, 4 Drawing Sheets

P+1 CHANNEL MEMORY CANDIDATES

|  | L(0) | L(1) | - - - - | L(P) |
|---|---|---|---|---|
| M+1 SYNC POSITIONS | Q(0, 0) | Q(0, 1) | - - - - | Q(0, P) |
| | Q(1, 0) | Q(1, 1) | - - - - | Q(1, P) |
| | ⋮ | ⋮ | | ⋮ |
| | Q(M, 0) | Q(M, 1) | - - - - | Q(M, P) |

Figure 2

DETERMINANT-BASED SYNCHRONIZATION TECHNIQUES AND SYSTEMS

BACKGROUND

The field of the invention relates to synchronization of received radio signals and, in particular, to methods and systems for synchronizing to such signals using determinant-based techniques.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

In a digital cellular radio communication system, radio signals which are digitally modulated are used to convey information between radio base stations and mobile stations. The radio base stations transmit downlink signals to the mobile stations and receive uplink signals transmitted by the mobile stations. A common problem that occurs in digital cellular radio communication systems is the loss of information in the uplink and downlink signals as a result of multipath fading and interference which may exist in the radio transmission channel.

With regard to the former, multipath fading, there are basically two multipath effects: fading and time dispersion. When the path length between a mobile station and a base station is relatively short, fading arises from the interaction of the transmitted signal, or main ray, and reflections thereof, or echoes, which arrive at the receiver at approximately the same time. When this occurs, the main ray and echoes add either destructively or constructively. If there are a large number of echoes, the pattern of destructive and constructive addition takes on a Rayleigh distribution, which is why this effect is sometimes called "Rayleigh fading". Certain points in the fading pattern, where destructive addition results in fading "dips", result in a relatively low carrier-to-noise (C/N) characteristic of the received signal.

The effects of fading dips can be mitigated by having multiple receive antennas and employing some form of diversity combining, such as selective combining, equal gain combining, or maximal ratio combining (MRC), wherein signals from each receive antenna are combined to create a single received signal. Diversity techniques take advantage of the fact that the fading on the different antennas is not the same, so that when one antenna receives a fading dip, chances are the other antenna does not. Note Mobile Communications Design Fundamentals by William C. Y. Lee, Howard W. Sams & Co., Indiana, USA. In section 3.5.1 of this book, several examples are given describing how signals from two receiver amplifiers with separate antennas can be combined to counteract fading.

For longer path lengths, time dispersion occurs when the echoes are delayed with respect to the main ray. If an echo of sufficient magnitude arrives at the receiver delayed from the main ray by an amount of time on the order of the symbol period, time dispersion gives rise to intersymbol interference (ISI). Time dispersion may be advantageously corrected by using an equalizer. In the case of digital signal modulation, a maximum likelihood sequence estimation (MLSE) detector such as described in Digital Communications, $2^{nd}$ Ed., by John G. Proakis, Mc-Graw Hill Book Company, New York, N.Y., USA, 1989 may be used. In section 6.7 of this book, various methods are described for detecting signals corrupted by time dispersion, or inter-symbol interference (ISI), using MLSE detection.

There may also exist signal sources in the radio environment which are not orthogonal to the desired signal. Non-orthogonal signals, or interference, often come from radios operating on the same frequency (i.e., co-channel interference) or from radios operating on neighboring frequency bands (i.e., adjacent-channel interference). When the carrier-to-interference ratio (C/I) of a channel is too low, the quality of voice or data output at the mobile station is poor. Many techniques have been developed in order to minimize interference to tolerable levels including frequency re-use patterns and adaptive beamforming which can be used to steer a null in an antenna pattern in the direction of an interferer.

More recently, methods have been proposed that partially solve the problems of multipath fading and interference. In U.S. Pat. No. 5,191,598 to Bäckstrom, et al., for example, the problem of accurately detecting signals in the presence of fading and time dispersion is overcome by using a Viterbi-algorithm having a transmission function estimated for each antenna. By reference thereto, U.S. Pat. No. 5,191,598 is incorporated herein in its entirety. Another method of accurately detecting signals in the presence of fading and interference was presented in the IEEE Transactions on Vehicular Technology, Vol. 42, No. 4, November 1993, J. H. Winters: "Signal Acquisition and Tracking with Adaptive Arrays in the Digital Mobile Radio System IS-54 with Flat Fading".

Although the above described conventional techniques can be used to improve signal quality, there remains room for improvement. Thus, in U.S. Pat. No. 5,680,419, the disclosure of which is incorporated here by reference, interference rejection combining (IRC) techniques are described which combat interference by, for example, using impairment correlations to improve the maximum likelihood sequence estimation. In contrast to the MRC techniques employed in many of today's base stations, it is important for IRC methods that each antenna branch is aligned to the same synchronization position. This alignment of synchronization positions might be done by selecting the same position for both branches based on the branch having the largest signal-to-noise ratio (SNR). However, the performance of IRC methods depend on their ability to attenuate the interference for the selected synchronization position. The synchronization should therefore not only detect the position where the SNR is largest, but also the position where the interference in the branches is most correlated. Such a synchronization method, discussed in "Burst Synchronization on Unknown Frequency Selective Channels with Co-Channel Interference using an Antenna Array," D. Asztely, A. Jakobsson, and L. Swindlehurst, In VTCC-99, Houston, USA, May, 1999, (the disclosure of which is incorporated here by reference) is based on determinants of estimated correlation matrices of the disturbances.

However, the straightforward application of the determinant synchronization technique described in this article is computationally very intensive, making implementation difficult or impossible. Moreover, the techniques described in this article do not take into account the desirability of adapting the technique to varying conditions, e.g., by varying the number of channel taps employed by a receiver.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

According to the present invention, methods and systems alternate between synchronizing and estimating a number of channel taps. The synchronizing can be performed by applying either trace or determinant operations on estimated noise covariance matrices.

Exemplary methods and systems for processing a received signal using a variable number of channel taps perform the steps of: estimating a preliminary synchronization position based on a largest number of channel taps; determining a number of channel taps to be used to process said received signal using the preliminary synchronization position; determining a final synchronization position based on the determined number of channel taps; and calculating a channel estimate using the determined number of channel taps and the final synchronization position. This procedure for synchronization and channel estimation, using an adaptive number of taps, can be applied to any number of branches e.g., antenna diversity receptions and fractional spaced receiver designs.

Exemplary embodiments are described for determinant based synchronization which improves the performance, in terms of reduced bit errors and block errors, of multi-branch receivers. Moreover, by reusing calculations and employing predetermined matrix factorizations, e.g., Cholesky factorizations the computational complexity of these techniques is reduced to a point where implementation of determinant synchronization becomes possible in e.g., digital signal processors (DSP).

The above features and advantages of the present invention will be more apparent and additional features and advantages of the present invention will be appreciated from the following detailed description of the invention made with reference to the drawings.

BRIEF DESCRIPTION OF THE DRAWINGS

FIG. 2 is a diagram depicting exemplary noise covariance matrices which are selectively evaluated according to exemplary embodiments of the present invention;

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are based upon the time division multiple access ("TDMA") protocol, in which communication between the base station and the mobile terminals is performed over a number of time slots. However, those skilled in the art will appreciate that the concepts disclosed herein find use in other protocols, including, but not limited to, frequency division multiple access ("FDMA"), code division multiple access ("CDMA"), or some hybrid of any of the above protocols. Likewise, some of the exemplary embodiments provide illustrative examples relating to GSM-type systems; however, the techniques described herein are equally applicable to radio communication systems operating in accordance with any specification.

Figure 1:
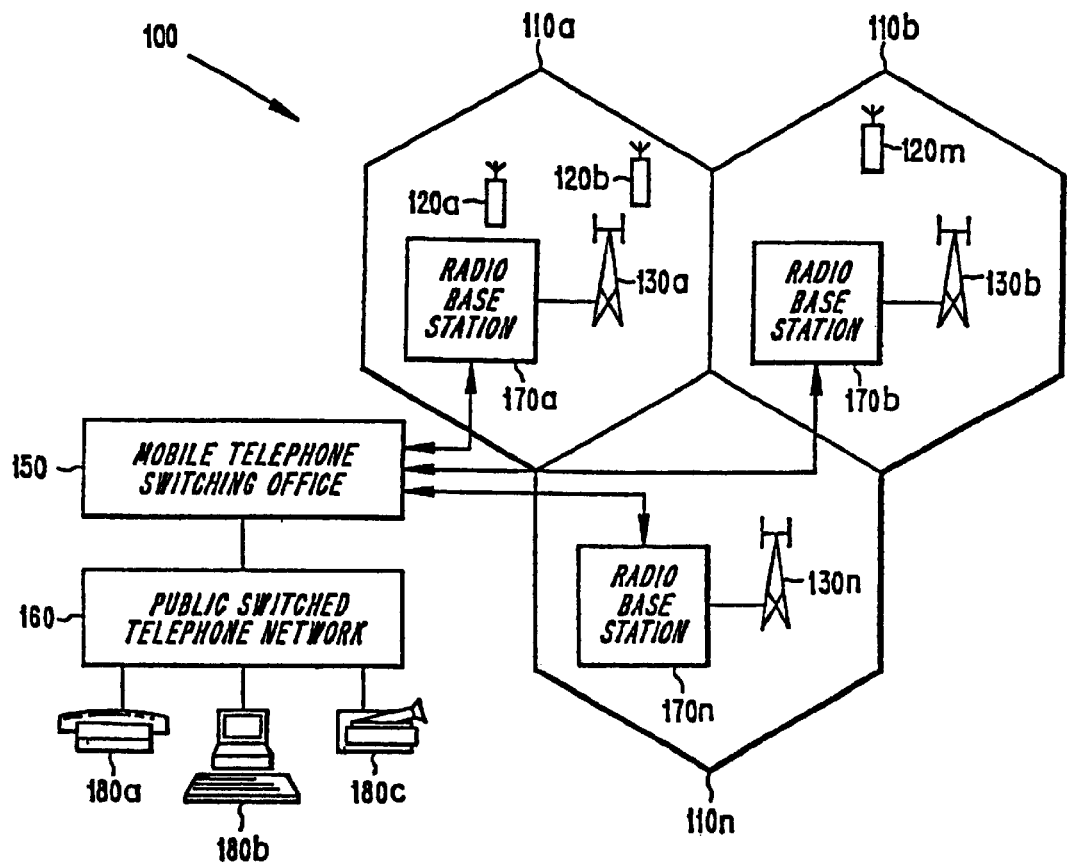
FIG. 1 is a block diagram of a radio communication system in which the present invention can be employed.

FIG. 1 is a block diagram of a general radio communication system in which an embodiment of the invention may be practiced. The radio communication system 100 of FIG. 1 includes a plurality of radio base stations 170a–n connected to a plurality of corresponding antennas 130a–n. The radio base stations 170a–n in conjunction with the antennas 130a–n communicate with a plurality of mobile terminals (e.g. terminals 120a, 120b, and 120m) within a plurality of cells 110a–n. Communication from a base station to a mobile terminal is referred to as the downlink, whereas communication from a mobile terminal to the base station is referred to as the uplink.

The base stations are connected to a mobile switching center ("MSC") 150. Among other tasks, the MSC coordinates the activities of the base station, such as during the handoff of a mobile terminal from one cell to another. The MSC, in turn, can be connected to a public switched telephone network 160, which services various communication devices 180a, 180b, and 180c. Both the mobile terminals 120a, 120b, and 120m, and the base stations 170a–n can incorporate determinant-based synchronization structures and techniques according to the present invention. According to exemplary embodiments of the present invention, these methods provide for selecting the number of channel taps associated with a radio channel, finding a synchronization position associated with information transmitted over that channel and determining a channel estimate associated with that channel. To perform these functions, methods according to the present invention employ sets of correlation matrices of the noise, which sets are defined by a number of synchronization positions and by several candidate values of the number of channel taps.

Before proceeding to provide a more detailed explanation of the present invention, the following exemplary variables are defined for exemplary embodiments to ease the reader's understanding thereof:

| | | |
|---|---|---|
| a) | $r_0(n)$ | $n = 0, \ldots, N$. Received signal for diversity branch 0, where N is the number of samples received. |
| b) | $r_1(n)$ | $n = 0, \ldots, N$. Received signal for diversity branch 1. |
| c) | $r_k(n)$ | $n = 0, \ldots, N$. Received signal for diversity branch number k. |
| d) | $s(n)$ | Training symbols, $n = 0, \ldots$, where the symbols e.g., belong to the set $s(n) \in \{-1, 1\}$ (for GSM). |
| e) | $Sync_{Flag}$ | Synchronization flag. Equal to 0 if trace sync shall be used and equal to 1 if determinant sync shall be used. |
| f) | $L(p)$ | $p = 0, 1, \ldots, P$. The channel memory candidates used in the least squares (LS) channel estimations, in which $L(p)<L(p+1)$. The number of taps equals $L(p)+1$. |
| g) | M | The number of considered synchronization candidates equals M+1. |
| h) | $\tilde{n}_0$ | Center of the synchronization window. Refers to the expected position of the first synchronization symbol in a burst. |

-continued i) H(m,p)    The least square estimate of the finite impulse response (FIR) channel where m refers to a synchronization position candidate, m = 0, 1, ... M, and where p refers to the channel memory candidate L(p).
j) Q(m,p)    The noise covariance matrix associated with synchronization position candidate m and channel memory candidate L(p).

The following notations are used throughout the specification:

a) $\arg\min_m\{F(m)\}$    Returns the argument m which corresponds to the minimum value of F(m).
b) $X^T$    Transpose of the vector, or matrix, X
c) $X^*$    Conjugate all the elements of X
d) $X^H$    Hermite i.e., conjugate and transpose of X
e) $X^{-1}$    Matrix inverse of the square matrix X The noise covariance matrices and the channel estimates are calculated in the following description according to:

$$Q(m,p) = C_{RR}(m,p) - C_{RS}(m,P)C_{SS}^{-1}(p)C_{RS}^H(m,P) \quad (1a)$$

$$H(m,p) = C_{RS}(m,p)C_{SS}^{-1}(p) \quad (1b)$$

where:

$C_{RR}(m, p)$ denotes the covariance matrix of a received signal. The computational complexity associated with calculating these matrices can be reduced by reusing calculations between different number of channel taps and different synchronization position, as discussed above.

$C_{RS}(m, p)$ denotes the cross-covariance matrix between the received signal and the training sequence.

$C_{SS}^{-1}(p)$ denotes the inverse of the covariance matrix of the training sequence and is associated with the channel memory candidate L(p). The matrix $C_{ss}(p)$, for a training sequence of 26 symbols such as in the GSM examples provided herein, is defined as:

$$C_{ss}(p) = \sum_{n=L}^{25} S_p(n)S_p^T(n) \quad (2)$$

where:

$$S_p(n) = [s(n)s(n-1) \ldots s(n-L(p))]^T \quad (3)$$

is a vector with synchronization symbols.

The synchronization symbols are always known by the receiver and $C_{SS}^{-1}(p)$ can therefore be precalculated and stored for all channel memory candidates. However, in the exemplary embodiments of the present invention the matrices $C_{SS}^{-1}(p)$ are not used directly, but are instead factorized according to:

$$C_{SS}^{-1}(p) = A^H(p)A(p) \quad (4)$$

where A(p) is a square matrix of dimension $(L(p)+1)_x(L(p)+1)$. For the GSM example, the synchronization symbols are real-valued such that $A^H(p) = A^T(p)$. The factorization of equation (4) can e.g. be a Cholesky factorization, which results in an upper triangular matrix:

$$A(p) = \begin{bmatrix} a(0,0,p) & a(0,1,p) & \ldots & a(0,L(p),p) \\ 0 & a(1,1,p) & & a(1,L(p),p) \\ \ldots & & & \ldots \\ 0 & \ldots & 0 & a(L(p),L(p),p) \end{bmatrix} \quad (5)$$

with $(L(p)+1)(L(p)+2)/2$ non zero elements of A(p), stored for each p.

The second term on the right hand side of equation (1a) represents a covariance matrix C(m,p) of the desired signal, estimated over the training sequence. By substituting equation (4) into equation (1a), it follows that this covariance matrix can be calculated as:

$$C(m,p) = C_{RS}(m,p)A^H(p)A(p)C_{RS}^H(m,p) = B^H(m,p)B(m,p) \quad (6)$$

where $$B(m,p) = A(p)C_{RS}^H(m,p) \quad (7)$$

By using the equations (4), (6) and (7), it readily follows that the least squares solutions (1a) and (1b) can equivalently be expressed as:

$$Q(m,p) = C_{RR}(m,p) - C(m,p) \quad (8)$$

When A(p) is upper triangular and real-valued, the computational complexity associated with the calculation of Q(m,p) and H(m,p) is significantly reduced for $$H(m,p) = B^H(m,p)A(p) \quad (9)$$

channels with many taps, i.e. when L(P) is a large number.

As mentioned above, techniques according to the present invention involve the use of certain noise correlation matrices. More specifically, the exemplary embodiments of the present invention evaluate selected portions of noise covariance matrices which are associated with a candidate synchronization position, $0 \leq m < M$, and a choice of channel memory, $L(0), L(1), \ldots, L(P)$. To provide an illustrative example, for the case with two branches, a noise covariance matrix is of dimension 2×2 and defined as:

$$Q(m,p) \equiv \begin{bmatrix} q(0,0,m,p) & q(0,1,m,p) \\ q(1,0,m,p) & q(1,1m,p) \end{bmatrix} \begin{array}{l} m = 0, 1, \ldots, M \\ p = 0, 1, \ldots, P \end{array} \quad (10)$$

The elements on the main diagonal of this matrix (i.e., q(0,0,m,p), and q(1,1,m,p)) are associated with the estimated noise variances, on each branch, and the off-diagonal elements are associated with the cross-correlation between the noise in the two branches. The covariance matrices are hermitian, which in the two branch example implies:

$$q(1,0,m,p) = q^*(0,1,m,p) \quad (11)$$

Methods and structures according to the present invention will, therefore, estimate selected portions of these noise covariance matrices which are conceptually illustrated in FIG. 2.

Figure 3:
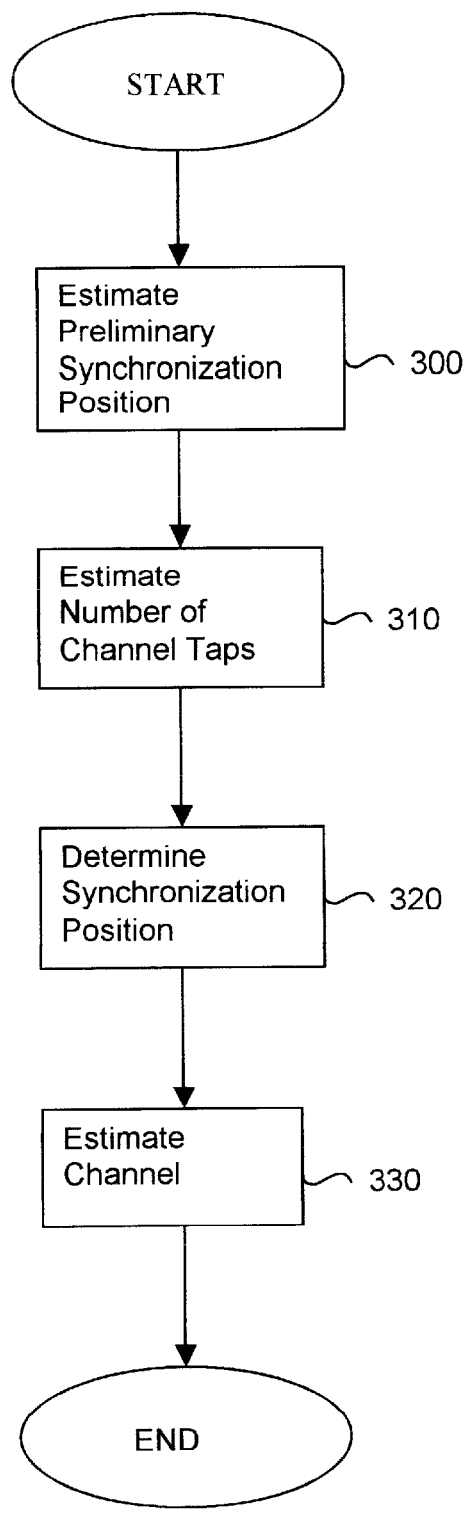
FIG. 3 is a flow diagram depicting an overall method of processing a received signal, according to an exemplary embodiment of the present invention.

An exemplary method for processing received signals in accordance with the present invention is illustrated by the flow diagram of FIG. 3. Therein, as step 300, a preliminary synchronization position A is estimated by evaluating the noise covariance matrices associated with the largest number of channel taps L(P). More specifically, the diagonal elements of the noise covariance matrices Q(m,P), $0 \leq m \leq M$ are evaluated using the trace operator (described below) to identify the minimum noise covariance matrix in this group, whose synchronization position is selected as the preliminary synchronization position $\hat{m}$. In step 310 the number of channel taps is estimated, based on the preliminary synchronization position $\hat{m}$. Again, this step evaluates only the diagonal elements of the noise covariance matrices $Q(m,p)$, $0 \leq p \leq P$, $0 \leq m \leq M$, using the trace operator. Step 320 follows step 310 and determines a synchronization position based on the estimated number of channel taps. In this step, the determinant of $Q(m,p)$ is used which also requires the calculation of the off-diagonal of the noise covariance matrices. Steps 310 and 320 can be repeated, as necessary. Finally, at step 330, the channel is estimated, e.g., using a least squares channel estimation technique. As mentioned above, steps 300 and 310 employ the trace operator, instead of the determinant, to estimate a preliminary synchronization position and the number of channel taps. This reduces the computational complexity associated with these techniques, since the trace operator only requires estimation of the diagonal elements of the noise covariance matrices being evaluated, whereas calculating the determinant requires the estimation of all elements of these matrices. For example, for the 2×2 matrix shown in equation (10), the trace operator is defined as:

$$\text{trace}(Q(m,p)) = q(0,0,m,p) + q(1,1,m,p) \quad (12)$$

and the determinant:

$$|Q(m,p)| = q(0,0,m,p)q(1,1,m,p) - |q(0,1,m,p)|^2 \quad (13)$$

Having provided an overview in FIG. 3 of techniques for determinant-based synchronization according to exemplary embodiments of the present invention, more detail regarding each of the steps outlined therein shall now be provided. Preliminary Synchronization Position Determination (step 300) Identifying a preliminary synchronization position involves evaluating certain portions of noise covariance matrices and employing those portions in a trace operator as mentioned above. To describe this technique further, some notation is first established. Herein, the center of the synchronization window is denoted as $\tilde{n}_0$. The synchronization position is then to be found in a window of M+1 samples around this position, i.e., from position $$\tilde{n}_0 - \frac{M}{2} \text{ to } \tilde{n}_0 + \frac{M}{2}.$$

The position $n_f$ is used here to denote the first synchronization position considered in the received signal, i.e.

$$n_f = \tilde{n}_0 - \frac{M}{2}.$$

In order to calculate the noise covariance matrices, i.e., $$Q(m,P) = C_{RR}(m,P) - C(m,P) \quad (14)$$

in which $$C(m,P)C_{RS}(m,P)A^H(P)A(P)C_{RS}^H(m,P) = B^H(m,P)B(m,P) \quad (15)$$

for M+1 values of m, the following two covariance matrices are estimated. First, the cross-correlation matrices between the received signals and the synchronization symbols are calculated as:

$$C_{RS}(m, P) = \begin{bmatrix} c_{rs}(0, 0, m, P) & \ldots & c_{rs}(0, L(P), m, P) \\ c_{rs}(1, 0, m, P) & \ldots & c_{rs}(1, L(P), m, P) \end{bmatrix} \quad (16)$$

$$= \sum_{n=L(P)}^{25} \begin{bmatrix} r_0(n_f + n + m) \\ r_1(n_f + n + m) \end{bmatrix} [s(n) \ s(n-1) \ \ldots \ s(n-L(P))].$$

Second, the auto-correlation matrices between the received signals are calculated as:

$$C_{RR}(m, P) = \begin{bmatrix} c_{rr}(0, 0, m, P) & c_{rr}(0, 1, m, P) \\ c_{rr}*(0, 1, m, P) & c_{rr}(1, 1, m, P) \end{bmatrix} \quad (17)$$

$$= \sum_{n=L(P)}^{25} \begin{bmatrix} r_0(n_f + n + m) \\ r_1(n_f + n + m) \end{bmatrix}$$

$$[r_0*(n_f + n + m) \ r_1*(n_f + n + m)].$$

The correlation matrices $C_{RS}$ and $C_{RR}$ are calculated for the maximum channel length L(P) only but for each synchronization position m=0, 1 ..., M.

Then, the noise covariance matrices are calculated in two steps. First, the elements of the matrix B(m,P) are calculated as:

$$B(m, P) = \begin{bmatrix} b(0, 0, m, P) & b(0, 1, m, P) \\ b(1, 0, m, P) & b(1, 1, m, P) \\ \ldots & \ldots \\ b(L(P), 0, m, P) & b(L(P), 1, m, P) \end{bmatrix} = A(P)C_{RS}^H(m, P) \quad (18)$$

and secondly, the elements of the matrix C(m,P) are calculated as:

$$C(m, P) = \begin{bmatrix} c(0, 0, m, P) & c(0, 1, m, P) \\ c*(0, 1, m, P) & c(1, 1, m, P) \end{bmatrix} = B^H(m, P)B(m, P) \quad (19)$$

Finally, the synchronization position m which yields the minimum trace value of the noise covariance matrices Q(m,P), m=0, 1, ..., M is selected as the preliminary synchronization position.

According to exemplary embodiments of the present invention, the number of calculations performed in step 300 can be reduced by reusing calculations involved in determining the noise covariance matrices as part of this process. More specifically, techniques according to the present invention can reuse calculations as exemplified by the following pseudo-code.

/* The first sync. position*/

L = L(P)

m = 0

For i = 0 to 1

-continued

```
For j = 0 to L
```

$$c_{rs}(i, j, m, P) = \sum_{n=L}^{25} r_i(n_f + n + m)s(n - j)$$

```
    end
```

$$c_{rr}(i, i, m, P) = \sum_{n=L}^{25} |r_i(n_f + n + m)|^2$$

```
end
/*** The remaining sync. positions ***/
For m = 1 to M
    For i = 0 to 1
        For j = 0 to L - 1
```

$$c_{rs}(i, j, m, p) = c_{rs}(i, j + 1, m - 1, P)$$
$$- r_i(n_f + L + m - 1)s(L - j - 1)$$
$$+ r_i(n_f + 26 + m - 1)s(26 - j - 1)$$

```
        end
```

$$c_{rs}(i, L, m, P) = \sum_{n=L}^{25} r_i(n_f + n + m)s(n - L)$$

$$c_{rr}(i, i, m, P) = c_{rr}(i, i, m - 1, P) +$$
$$- |r_i(n_f + L + m - 1)|^2 + |r_i(n_f + 26 + m - 1)|^2$$

```
    end
end
```

```
/*** Estimating preliminary synchronization position ***/
L = L(P)
λ = /*** Large number ***/
For m = 0 to M
    For i = 0 to L
        For j = 0 to 1
```

$$b(i, j, m, P) = \sum_{n=i}^{L} a(i, n, P)c_{rs}^*(j, n, m, P)$$

```
        end
    end
    For i = 0 to 1
```

$$c(i, i, m, P) = \sum_{n=0}^{L} |b(n, i, m, P)|^2$$

$$q(i, i, m, P) = c_{rr}(i, i, m, P) - c(i, i, m, P)$$

```
    end
    λ_tmp = q(0, 0, m, P) + q(1, 1, m, P)
    if λ_tmp < λ
        λ = λ_tmp
        m̂ = m
    end
end
```

Note in the foregoing pseudo-code that the calculations of $c_{rs}$ and $c_{rr}$ for second and subsequent synchronization positions does not involve a direct and complete recalculation of these values but instead are calculated as offsets from previous $c_{rs}$ and $c_{rr}$ values, respectively. This provides a significant reduction in the computational complexity associated therewith. Moreover, certain data sets calculated as part of the process of determining the preliminary synchronization position are saved in order to re-use them in subsequent calculations. Specifically the data sets:

$q(i, i, m, P)$, $i \in \{0, 1\}$, $m \in \{0, \ldots, M\}$
$c_{rr}(i, i, m, P)$, $i \in \{0, 1\}$, $m \in \{0, \ldots M\}$
$c_{rs}(i, j, m, P)$, $i \in \{0, 1\}$, $j \in \{0, \ldots, L(P)\}$, $m \in \{0, \ldots, M\}$
$b(i, j, m, P)$, $i \in \{0, \ldots, L(P)\}$, $j \in \{0, 1\}$, $m \in \{0, \ldots, M\}$.

Estimating the Number of Channel Taps (Step 310)

After a preliminary synchronization position is selected, the next step is to estimate the number of channel taps which most accurately characterizes the current channel conditions. This estimate will then be used to determine a final synchronization position and can, additionally, be used for other purposes, e.g., Maximum Likelihood Sequence Estimation (MLSE) detection. The estimation of the number of channel taps is based on a criterion W(p) that both measures the accuracy of the model, here in terms of the magnitude of trace(Q(m,p)), and the model complexity, here in terms of the number of taps. The criterion has the structure:

$$W(p) = \text{trace}(Q(m,p))F(L(p)) \qquad (20)$$

where F(L(p)) is a non-negative and monotonously increasing function of L(p).

In the following example, the Akaike Information Criteria (AIC) is used, which can be expressed as:

$$W(p) = AIC(p) = \text{trace}(Q(m,p))AIC_{factor}(L(p)) \qquad (21)$$

where $$F(L(p)) = AIC_{factor}(L(p)) = \frac{1}{26 - L(p)} e^{2\frac{L(p)+1}{26-L(p)}}. \quad (22)$$

The channel memory candidate L(p) associated with the smallest criterion W(p) is selected as the estimated number of channel taps, i.e.:

$$\hat{p} = \arg\min_p \{W(p)\}. \quad (23)$$

The values of the function F(L(p)) (or as in this example the AIC factor (L(p)) in equation (22)) can be precalculated and stored in e.g., the base or mobile station, for all potential channel taps. The estimation of the number of channel taps could use other methods than the AIC, for example, MDL (Minimum Description Length), FPE (Final Prediction Error) or F-test (a test based on the F distribution).

As mentioned above, since the criterion for selecting the number of channel taps is based on the trace of estimated noise covariance matrices, only the diagonal elements of Q(m, p) are estimated. Moreover, in step 300 the diagonal elements of Q(m, P) were calculated and stored, for all the synchronization positions m=0, 1, . . . M, and, therefore, can be reused here. Thus, the following pseudo-code exemplifies how step 310 can be performed in a computationally efficient manner according to an exemplary embodiment of the present invention.

```
/*** Initialization*** /

AIC_min = (q(0, 0, P) + q(1, 1, P))AIC_factor(L(P))

p̂ = P

/*** Main loop starts here*** /

For m = 0 to M

For p = P-1 down to 0

/*** Re-using of data*** /

For i = 0 to 1

For j = 0 to L(p)
```

$$c_{rs}(i, j, m, p) = c_{rs}(i, j, m, p+1) + \sum_{n=L(p)}^{L(p+1)-1} r_i(n_f + n + m)s(n - j)$$

```
            end
```

$$c_{rr}(i, i, m, p) = c_{rs}(i, i, m, p+1) + \sum_{n=L(p)}^{L(p+1)-1} |r_i(n_f + n + m)|^2$$

```
        end

/*** Noise covariance matrices*** /

For i = 0 to L(p)

For j = 0 to 1
```

$$b(i, j, m, p) = \sum_{n=i}^{L(p)} a(i, n, p)c_{rs}^*(j, n, m, p)$$

```
            end end

For i = 0 to 1
```

$$c(i, i, m, p) = \sum_{n=0}^{L(p)} |b(n, i, m, p)|^2$$

$$q(i, i, m, p) = c_{rr}(i, i, m, p) - c(i, i, m, p)$$

```
        end

AIC = (q(0, 0, m, p) + q(1, 1, m, p))AIC_factor(L(p))
```

```
        if      AIC < AIC_min
                AIC_min = AIC
                p̂ = p
        end
    end
end
```

Note that the arguments m and p of $c_{rs}(i, j, m, p)$ can be excluded above i.e. replacing $c_{rs}(i, j, m, p)$ by $c_{rs}(i, j)$. This is because the elements of CRS(m, p) are used above only to calculate the elements of the noise covariance matrix $q(i, i, m, p)$ and the elements of the desired signal covariance matrix $c(i, i, m, p)$ for each value of m and p. The elements $c_{rs}(i, j, m, p)$ are not reused in any of the following sections. The variables which can be saved, in order to reuse them in subsequent processing, are listed below.

$q(i, i, m, \hat{p})$, $i \in \{0, 1\}$, $m \in \{0, \ldots, M\}$
$c_{rr}(i, i, m, \hat{p})$, $i \in \{0, 1\}$, $m \in \{0, \ldots, M\}$
$c(i, i, m, \hat{p})$, $i \in \{0, 1\}$, $m \in \{0, \ldots, M\}$
$b(i, j, m, \hat{p})$, $i \in \{0, \ldots, L(\hat{p})\}$, $j \in \{0, 1\}$, $m \in \{0, \ldots, M\}$.

Final Synchronization Position Determination (Step 320)

Figure 4:
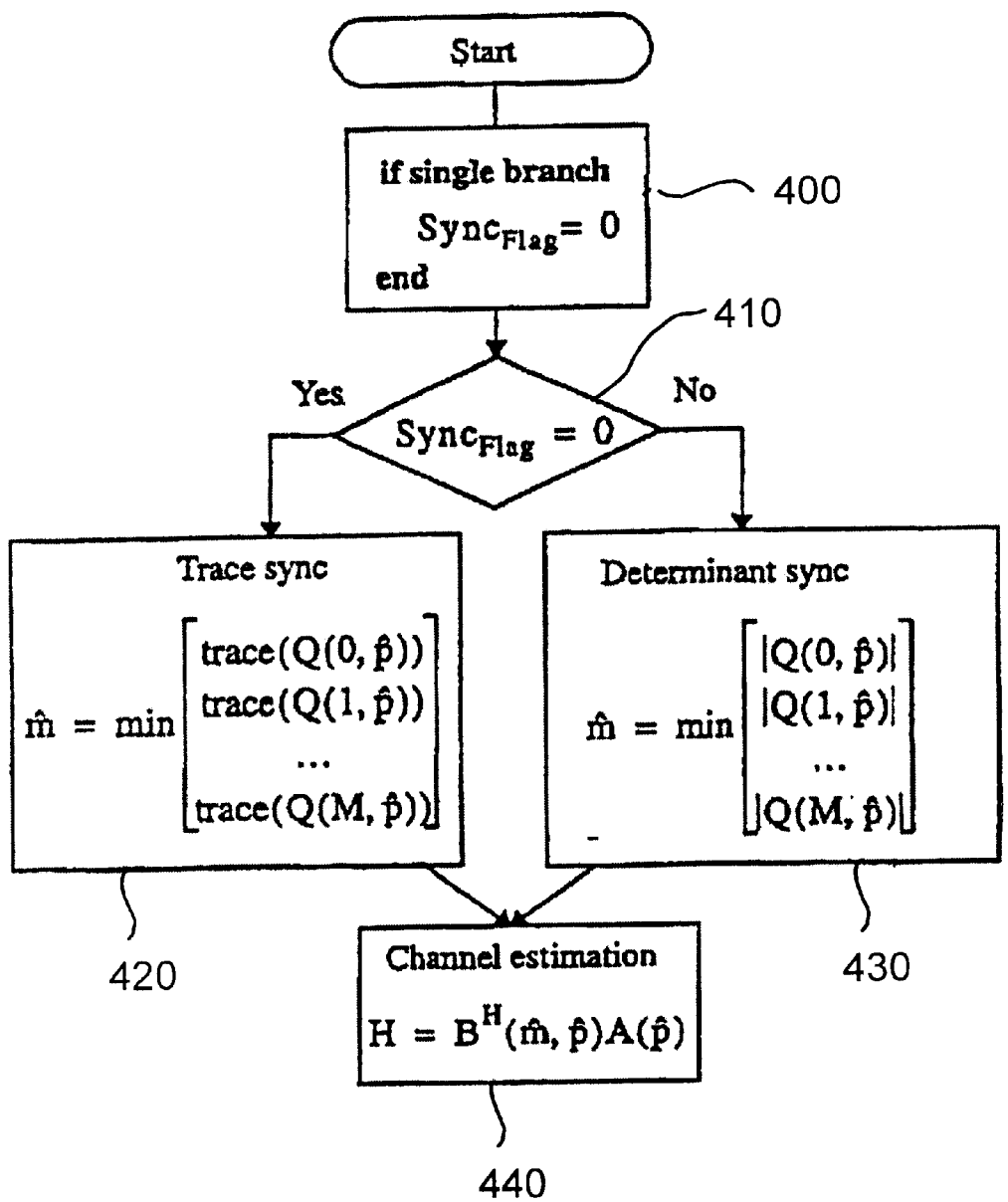
FIG. 4 is a flow diagram of alternative techniques for determining a final synchronization position based on a number of branches being considered according to an exemplary embodiment of the present invention.

The manner in which the final synchronization position is determined, based on the estimated number of channel taps, can vary depending upon whether the receiver is operating in a single or multi branch mode. This variation is depicted in the flowchart of FIG. 4. Initially, step 400 indicates that if the receiver only possesses a single antenna, i.e., is a single branch receiver, then trace synchronization will be used and $Sync_{Flag}$ is set equal to zero.

The process continues to step 410 where the input variable $Sync_{Flag}$ is evaluated to determine if trace or determinant synchronization shall be used. If the value of $Sync_{Flag}$ is 0, then trace synchronization is used and the flow proceeds to step 420. If, on the other hand, the value $Sync_{Flag}$ is not zero, then determinant synchronization is used and the flow proceeds to step 430. In addition to setting $Sync_{Flag}$ equal to zero at step 400 for single branch receivers, this process permits multibranch receivers to use either trace synchronization or determinant synchronization, e.g., by an initialization program which sets the value of $Sync_{Flag}$ outside of the flow depicted in FIG. 4.

The estimated final position of the first synchronization symbol in the received burst is then identified as $N_0 = n_f + \hat{m}$, where $\hat{m}$ is determined using either trace or determinant synchronization as reflected by FIG. 4.

According to exemplary embodiments of the present invention, the computational complexity associated with determinant synchronization can be reduced by reusing calculations between different synchronization positions. An example of this reuse is provided in the following pseudo-code.

/* Initialize */

$\hat{L} = L(\hat{p})$ $c_{rr}(0, 1, 0, \hat{p}) = \sum_{n=\hat{L}}^{25} r_0(n_f + n)r_1^*(n_f + n)$ -continued $c(0, 1, 0, \hat{p}) = \sum_{n=0}^{\hat{L}} b^*(n, 0, 0, \hat{p})b(n, 1, 0, \hat{p})$ $q(0, 1, 0, \hat{p}) = c_{rr}(0, 1, 0, \hat{p}) - c(0, 1, 0, \hat{p})$ $D_{min} = q(0, 0, 0, \hat{p})q(1, 1, 0, \hat{p}) - |q(0, 1, 0, \hat{p})|^2$ $\hat{m} = 0$ For m = 1 to M $c(0, 1, m, \hat{p}) = \sum_{n=0}^{\hat{L}} b^*(n, 0, m, \hat{p})b(n, 1, m, \hat{p})$ $c_{rr}(0, 1, m, \hat{p}) = c_{rr}(0, 1, m-1, \hat{p}) +$
$\quad -r_0(n_f + \hat{L} + m - 1)r_1^*(n_f + \hat{L} + m - 1)$
$\quad + r_0(n_f + 25 + m)r_1^*(n_f + 25 + m)$ $q(0, 1, m, \hat{p}) = c_{rr}(0, 1, m, \hat{p}) - c(0, 1, m, \hat{p})$ $D = q(0, 0, m, \hat{p})q(1, 1, m, \hat{p}) - |q(0, 1, m, \hat{p})|^2$ if    $D < D_{min}$
      $D_{min} = D$
      $\hat{m} = m$
end end Note that the calculation of $c_{rr}$ for synchronization positions subsequent to m=0 re-use previous calculations to reduce the computational complexity of the determinant synchronization algorithm.

Determining Channel Estimates (Step 330)

The least square channel estimates at the selected synchronization position and for the estimated channel length can be computed as:

$$H(\hat{m}, \hat{p}) = \begin{bmatrix} h_0(0) & h_0(1) & \ldots & h_0(\hat{L}) \\ h_1(0) & h_1(1) & \ldots & h_1(\hat{L}) \end{bmatrix} = B^H(m, p)A(p) \quad (24)$$

or equivalently

For $k = 0$ to $L(\hat{p})$ (25)

$$h_0(k) = \sum_{i=0}^{k} b*(i, 0, \hat{m}, \hat{p})a(i, k, \hat{p})$$

-continued $$h_1(k) = \sum_{i=0}^{k} b*(i, 1, \hat{m}, \hat{p})a(i, k, \hat{p})$$

end

Note that the foregoing exemplary embodiment of FIG. 3 has been described with reference to a particular order of the steps for estimating a synchronization position and for estimating the number of channel taps. Nevertheless, the order of these steps can be reversed. Furthermore, a more general formulation of the present invention involves alternating several times between estimating a synchronization position and estimating the number of channel taps. Either estimating a synchronization position or estimating the number of channel taps can be performed first. Each synchronization step can be performed using a selected one of either trace or determinant based techniques, independently of the other synchronization steps. In the present exemplary embodiment the synchronization steps includes, but are in general not limited to, trace and determinant techniques.

Exemplary embodiments have been described for determinant synchronization which, among other things, shall improve the performance of receivers' equalizers or detectors in terms of reduced bit errors and fewer block errors. Moreover, by reusing calculations and employing predetermined matrix factorization, e.g., Cholesky factorizations, the computational complexity of these techniques is reduced to a point where implementation of determinant synchronization becomes possible in fixed point, digital signal processor (DSP).

Those skilled in the art appreciate that the present invention can be implemented in devices that include fractional spaced receiver design. In fractional spaced sampled systems and terminals, the sampling rate is a multiple, U, of the symbol rate. For example, consider a received signal r'(k) that has been sampled at the sampling instants k=1, 2, . . . , with the multiple U=2. This signal can be regarded as two symbol spaced sampled signals, $r_1(n)$ and $r_2(n)$, by e.g. associating the odd samples r'(k), k=1, 3, . . . , with $r_1(n)$ and the even samples r'(k), k=2, 4, . . . with $r_2(n)$, in which n=1, 2 . . . . By associating $r_1(n)=r'(2n-1)$ and $r_2(n)=r'(2n)$, a column vector of two elements can be formed according to:

$$r(n) = [r_1(n) r_2(n)]^T \quad (26)$$

When considering D antennas and fractional spaced sampling in general, the number of vector elements will be D×U.

Thus, those skilled in the art will appreciate that the embodiments described above are merely given as examples and it should be understood that the invention is not limited thereto. It is of course possible to embody the invention in specific forms other than those described without departing from the spirit of the invention. Further modifications and improvements which retain the basic underlying principles disclosed and claimed herein, are within the spirit and scope of this invention.

What is claimed is:

1. A method for processing a received signal using a variable number of channel taps comprising the steps of:
   (a) estimating a preliminary synchronization position, wherein said step of estimating comprises the steps of:
      calculating values to determine elements of a noise covariance matrix for a first synchronization position; and
      reusing said values to determine elements of said noise covariance matrix for a second synchronization position;
   (b) using said preliminary synchronization position to determine a number of channel taps to be used to process said received signal;
   (c) determining a synchronization position based on said determined number of channel taps; and
   (d) calculating a channel estimate using the determined number of channel taps and the determined synchronization position.

2. The method of claim 1, further comprising the step of:
   repeating at least one of steps (b) and (c) prior to performing step (d).

3. The method of claim 1 further comprising the step of:
   storing selected results from said step of estimating a preliminary synchronization position for subsequent re-use.

4. The method of claim 1, wherein said step of estimating said preliminary synchronization position is based on a largest number of channel taps.

5. The method of claim 1, wherein said step of estimating said preliminary synchronization position further comprises the step of:
   using the trace of noise covariance matrices.

6. The method of claim 5, further comprising the step of:
   selecting, as said preliminary synchronization position, a synchronization position which associates with a smallest trace value of said noise covariance matrices.

7. The method of claim 1, wherein said values are elements of a cross-correlation matrix between said received signal and synchronization symbols.

8. The method of claim 1, wherein said values are elements of an autocorrelation matrix of said received signal.

9. The method of claim 1, wherein step (b) further comprises the step of:
   determining said number of channel taps using a trace operator.

10. The method of claim 1, wherein step (b) further comprises the steps of:
    calculating, for a predetermined synchronization position and a predetermined number of channel taps, at least one value as an offset from a stored value to determine elements of a noise covariance matrix.

11. The method of claim 10, wherein said at least one value is an element of a cross-correlation matrix between said received signal and synchronization symbols.

12. The method of claim 10, wherein said at least one value is an element of an autocorrelation matrix of said received signal.

13. The method of claim 1, wherein step (c) further comprises the step of:
    using either trace synchronization or determinant synchronization for determining said synchronization position based on a number of branches associated with said received signal.

14. The method of claim 1, wherein step (c) further comprises the steps of:
    using a determinant to identify said synchronization position.

15. The method of claim 14, further comprising the step of employing two branches and wherein said determinant is represented as:
    $|Q(M,p)|=q(0,0,m,p)q(1,1m,p)-|q(0,1,m,p)|^2$, where m is a synchronization position, prefers to a number of channel taps L(p)+1 and Q denotes a noise covariance matrix.

16. The method of claim 14, wherein step (c) further comprises the steps of:

an offset from a stored value to determine elements of a noise covariance matrix.

17. The method of claim 16, wherein said at least one value is an element of an autocorrelation matrix of said received signal.

18. The method of claim 1, further comprising the step of storing selected results from step a) for subsequent reuse in at least one of steps (c)–(d).

19. The method of claim 18, wherein said selected results include at least one of noise covariance matrix elements, cross-correlation matrix elements and autocorrelation matrix elements.

20. The method of claim 1, wherein at least one of steps (b)–(d) include the step of calculating noise covariance matrices associated with said received signal.

21. The method of claim 20, further comprising the step of matrix factorization of at least one matrix involved in calculating said noise covariance matrices to reduce computational complexity.

22. The method of claim 21, wherein said matrix factorization is a Cholesky factorization.

23. The method of claim 21, wherein said at least one matrix is a matrix of a training sequence associated with said received signal.

* * * * *